UNITED STATES PATENT OFFICE.

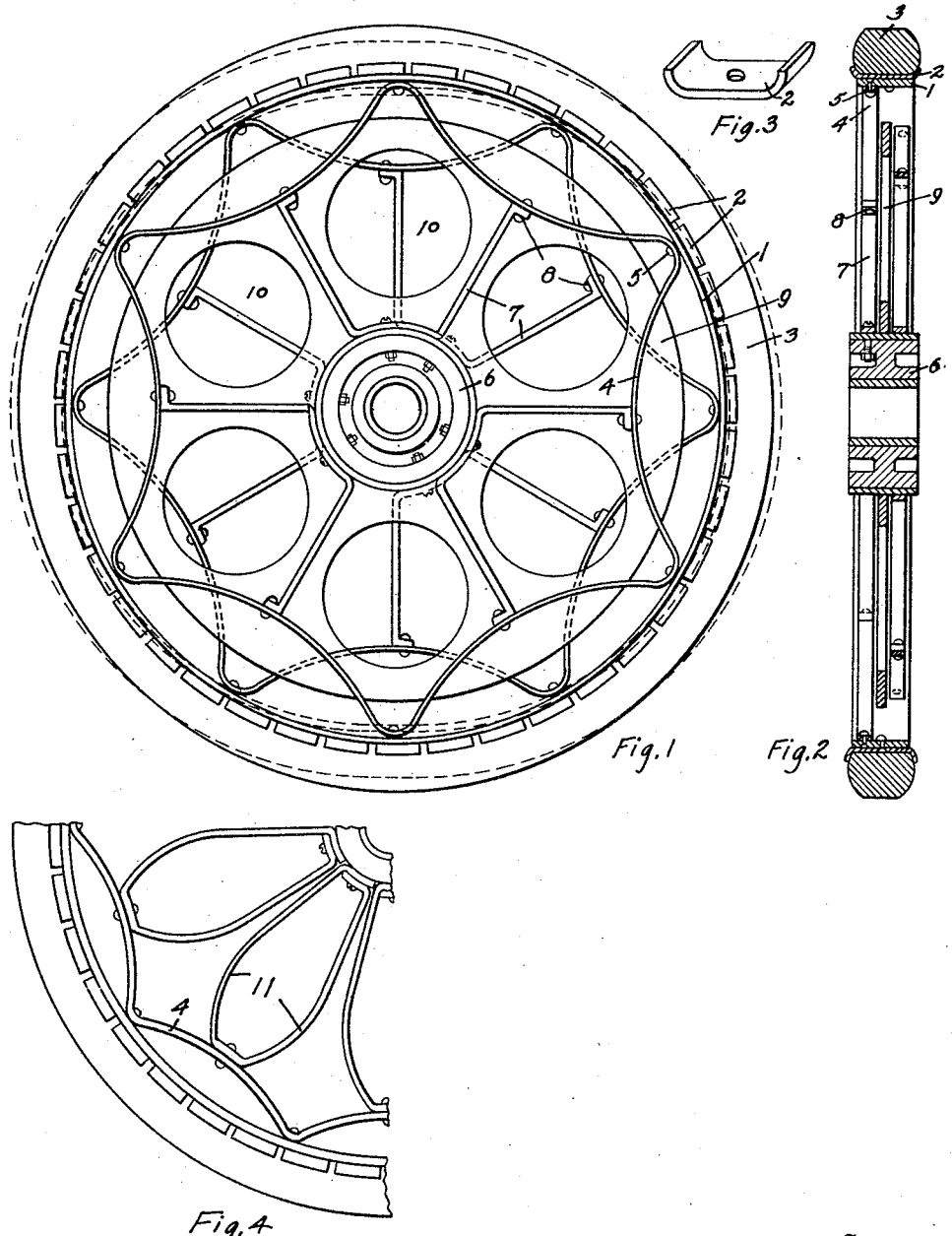

FREDERICK A. GUTH, OF WAVERLY, OHIO.

VEHICLE-WHEEL.

1,115,667.   Specification of Letters Patent.   Patented Nov. 3, 1914.

Application filed May 12, 1913. Serial No. 766,937.

*To all whom it may concern:*

Be it known that I, FREDERICK A. GUTH, a citizen of the United States, residing at Waverly, in the county of Pike and State of Ohio, have invented certain new and useful Improvements in Vehicle-Wheels, of which the following is a specification.

My invention relates to vehicle wheels and aims particularly to provide a wheel of resilient construction which may be either used in conjunction with or be made to replace the present-day pneumatic tires used upon wheels of motor vehicles. My wheel is somewhat of a departure from the present common construction, in that I have provided a flexible resilient rim portion. In the use of this flexible rim portion, it becomes essential that some supplemental cushioning structure be used and I have interposed a resilient spoke structure between this flexible rim portion and the hub structure, this spoke structure being radially extensible and compressible and also rotatably yieldable. Where a radially extensible and compressible spoke structure is used, it is absolutely necessary that this spoke structure be rotatably yieldable, especially in combination with a flexible rim. This is rendered so because of the slight oscillatory movement required by each radiating spoke, while the wheel is flexing.

My invention further aims to provide a structure for limiting the amount of flexing of the rim portion, in which case the wheel will have a predetermined amount of cushioning distance and at the same time a structure is provided to guard against excessive pressing of the rim to cause its breaking. It will be understood that by the use of this flexible rim portion, the wheel will upon striking an obstruction be made to assume somewhat of an oval shape, depending upon its combined inherent resiliency and the supplemental resilient elements for returning it to its natural position of roundness. It will further be understood that my wheel is not limited in its use to motor vehicles alone, although well adapted to this end, but may be used with equal effectiveness upon all carriers wherein a cushioning action is desired.

The preferred embodiment of my invention is shown in the accompanying drawings, in which similar characters of reference designate corresponding parts, and in which:

Figure 1 is a side elevation of my type of vehicle wheel showing the oval shape it assumes when performing its function, in broken lines, Fig. 2 is a vertical central section of the structure shown in Fig. 1, Fig. 3 is a view in perspective of one form of cleat utilized to hold the tire in position, and, Fig. 4 is a section of a wheel showing a slightly modified construction.

I desire it to be understood that the tread portion of my wheel may be made of solid rubber, or the present day type of pneumatic tire may be used if desired, this not forming the essential part of my invention. The invention of the present wheel resides primarily in the provision of a resilient flexible rim 1, to which may be attached a plurality of channel shaped cleats 2 for forming the means of attachment of the tire 3. Around the inner surface of the rim member, there is provided a continuous resilient strip 4 and rigidly attached to the rim by a suitable connection such as shown at 5. This resilient member is so constructed to form a plurality of semielliptic springs, being attached to a central hub 6 of any preferred construction, by means of outwardly radiating spoke elements 7, the latter being attached to the springs formed by the element 4, as shown at 8. Any desired number of these resilient bands may be provided and in Fig. 1, I have shown two, suitably spaced apart and having one spoke element for each semi-elliptic formation. It will be apparent that when the wheel strikes an obstruction, the lower portion will be elevated and due to the flexible and resilient nature of the rim the upper portion will be slightly compressed, thereby forcing the two ends outward to an oval shape such as shown by the broken lines in this figure. By careful study of the figure, it will be apparent that the spokes must be of a resilient nature or of a structure to give a slight yielding action in the plane of the wheel. Of course, means should also be provided to give the wheel lateral stability and in the drawings, the spokes are shown as being of a section to do this. However, to guard against excessive flexing of the rim member, I have provided a central disk 9 mounted upon the hub 6 and having its outer diameter of a size to give a predetermined amount of free movement of the rim. This central disk 9 is desirably centrally located between the two sets of spokes, but its particular location is not essential. This disk may also be provided with a plurality of cut-out portions 10 to decrease its weight.

The structure shown in Fig. 4 is similar in some respects to that just described, differing essentially in the construction of the spoke elements. In this figure, instead of providing single spoke elements as above, I have provided a plurality of spring spokes 11 constructed by suitably bending a wire to the shape indicated in this figure. It will be noted that aside from the cushioning action attained by the flexible resilient nature of the rim and the semi-elliptic springs formed by the member 4, the spring spokes 11 also assist somewhat in this action. It will further be apparent that, owing to the resilient nature of the rim portion, it will be necessary to provide spokes that are yielding in the direction of the plane of the wheel itself. This will be more apparent when it is borne in mind that the normally circular rim is given a somewhat oval shape when placed under impact. I have, therefore, provided all of the spoke elements to be yielding or resilient in the plane of the wheel itself, but rigid as regards movement in a lateral direction.

From the above, it will be apparent that I have provided a vehicle wheel that gives the desired degree of cushioning in a more uniform manner than has been possible to heretofore attain.

What I claim, is:

1. A resilient wheel comprising a hub, a resilient flexible rim, a plurality of semi-elliptically arranged springs around the inner surface of said rim, and a plurality of spokes yieldable rotatably in the plane of the wheel radiating from said hub and coöperating with said springs, said spokes being arranged to make the wheel rigid to lateral movement.

2. A resilient wheel comprising a hub, a resilient flexible rim, a plurality of semi-elliptic springs secured to said rim around its inner periphery, and a plurality of spokes radiating outwardly from said hub and engaging said springs but separately formed therefrom, said spokes being rigidly attached to said hub and being oscillatory about said mounting, said spokes being further rigidly attached to said springs and arranged to make the wheel rigid to lateral movement.

3. A resilient wheel comprising a hub, a resilient flexible rim, a plurality of inwardly bowed springs, the terminals of which are secured to the rim at widely separated points, and a plurality of spokes the outer ends of which connect to the central portions of said bowed springs and the inner ends of which are secured to said hub, said spokes being revolubly yieldable around said hub but laterally rigid.

4. A resilient wheel comprising a hub, a resilient flexible rim, a plurality of pairs of inwardly bowed springs, those springs forming each pair being arranged in staggered relation, the terminals of each spring being secured to the rim at widely separated points, and a plurality of spokes the outer ends of which connect to the central portions of said bowed springs and the inner ends of which are secured to said hub, said spokes being revolubly yieldable around said hub but laterally rigid.

In testimony whereof I affix my signature in presence of two witnesses.

FREDERICK A. GUTH.

Witnesses:
T. H. McCann,
Levi B. Moore.

Copies of this patent may be obtained for five cents each, by addressing the "Commissioner of Patents, Washington, D. C."